Dec. 20, 1960  J. GULARDO  2,965,371
SHOCK MOUNT
Filed Aug. 11, 1958
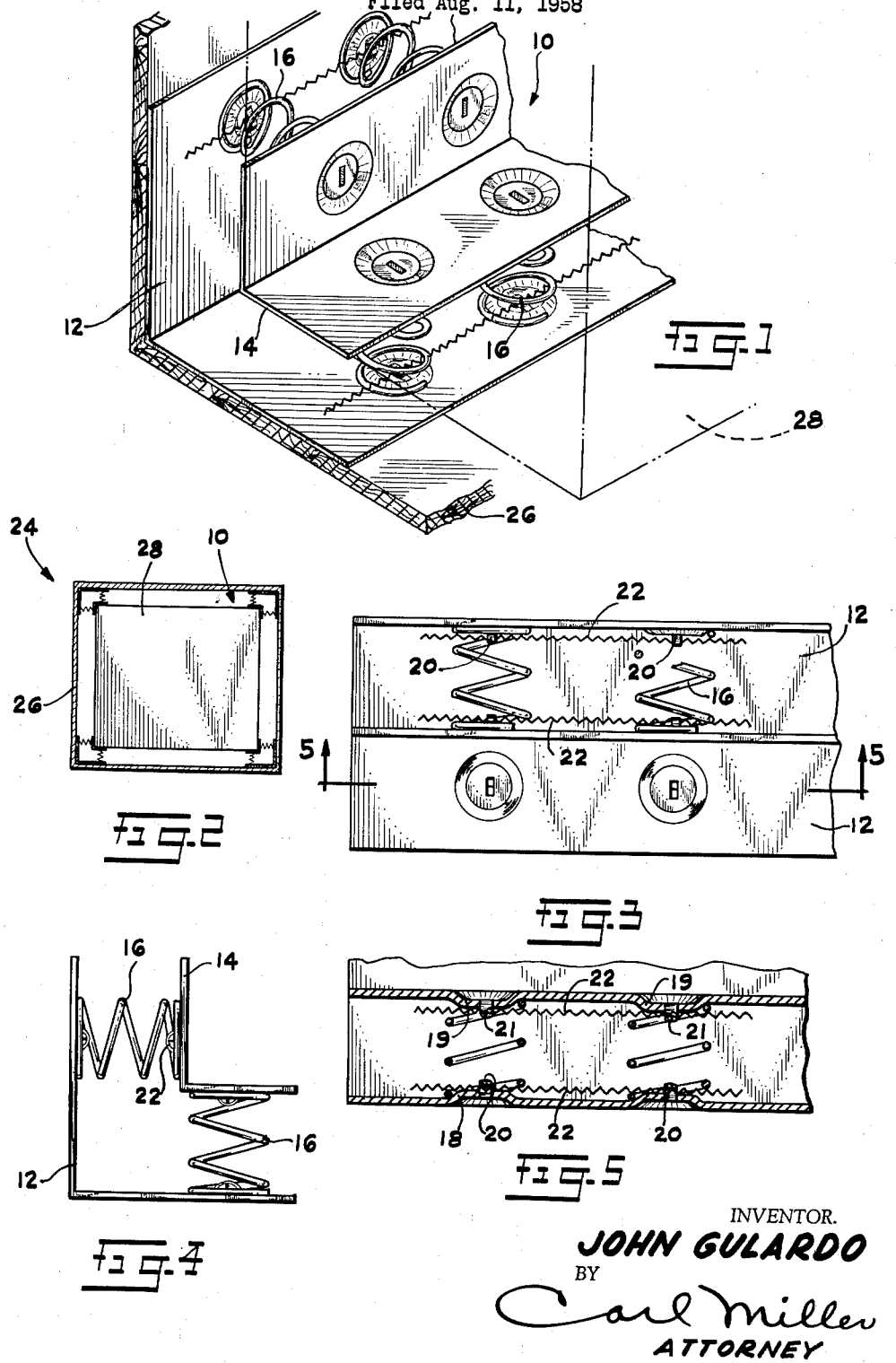
INVENTOR.
JOHN GULARDO
BY
*Carl Miller*
ATTORNEY United States Patent Office 2,965,371
Patented Dec. 20, 1960

2,965,371

SHOCK MOUNT

John Gulardo, 1866 E. 53rd St., Brooklyn, N.Y.

Filed Aug. 11, 1958, Ser. No. 754,477

2 Claims. (Cl. 267—1)

This invention relates to packing devices and, more particularly, to a shock absorbing mount for sensitive instruments.

It has been found that the rough handling ordinarily involved in the shipping of sensitive instruments is not only damaging to the instruments, but often requires expensive repairs and replacement of certain parts that further requires a substantial amount of time and expense. It is therefore an object of the present invention to provide a shock mount for relieving sensitive instruments of shock during transportation that is extremely simple in construction, efficient in operation, and which will overcome the aforementioned difficulties.

Another object of the present invention is to provide a shock mount that can be selectively applied between the inside of the packing case and the outside of the object being transported without requiring any structural change in such packing case or object.

Still a further object of the present invention is to provide shock mounts of the type described that can be economically manufactured in random lengths and cut to size during the packing of the transported object.

All of the foregoing and still further objects and advantages of this invention will become apparent from a study of the following specification, taken in connection with the accompanying drawing, wherein:

Figure 1 is a fragmentary perspective view of a mount made in accordance with the present invention in operative use;

Figure 2 is a cross sectional view of a complete transport package embodying shock mounts made in accordance with the present invention;

Figure 3 is a fragmentary top plan view of the shock mount made in accordance with the present invention;

Figure 4 is an end elevational view of the shock mount shown in Figure 3; and

Figure 5 is a fragmentary transverse cross sectional view taken along line 5—5 of Figure 3.

Referring now to the drawing, and more particularly to Figure 1 thereof, a shock mount 10 made in accordance with the present invention is shown to include a base 12 and a carrier 14, both of which are of substantially L-shaped configuration, the base 12 being of substantially larger size than the carrier portion 14. A plurality of compression coil springs 16 are interposed, in a particular manner, between the facing sides of the carrier and base members for yieldably supporting the carrier upon the base for relative movement in all directions.

As is more clearly shown in Figure 5 of the drawing, each leg of the L-shaped base and carrier members is provided with a continuous series of longitudinally spaced apart dimples 18, 19, that are directed in an outward direction relative to the carrier 14 and in an inward direction relative to the base 12 so as to provide positioning means for the opposite ends of the compression springs 16. These dimples extend partially into the opposite ends of the compression springs 16 and further include loops or bails 20, 21 through which a lock bar 22 of substantially corrugated construction is slidably extended. This bar 22 overlies the adjacent end of each coil spring and thus serves to lock it to the dimple mounting through the connection to the bails 20, 21.

In actual use, a complete packing unit 24 may be arranged in the manner shown in Figure 2. The object 28 being transported is placed upon the mounts 10 that are disposed within the interior of the packing container 26. These mounts may be provided in considerably long lengths, such being readily cut to size as they are applied to the interior of the packing assembly. Since they serve as spacers that substantially fill the space between the outside packing crate and the article being shipped, they are automatically locked in place against displacement so that it is not necessary to provide additional fastening elements to retain them in proper place.

If desired, the compression coil springs may be replaced by rubber mounts, other mechanical shock absorbing elements, hydraulic or air cylinders, or the like, depending upon the size and weight of the object being supported. It becomes a simple matter to accurately calculate the various tension requirements of the spring or yieldable elements to enable the proper size and number of such elements to be used in each case.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A shock mount comprising, in combination, a rigid base, a rigid carrier, a plurality of yieldable springs adjustably supporting said carrier upon said base for relative movement in all directions, said carrier being of substantially L-shaped cross sectional configuration, said base being of substantially L-shaped cross sectional configuration and of slightly larger dimensions than said carrier, said spring supporting said carrier in said base in substantially spaced apart parallel relationship, said springs comprising a plurality of compression coil springs, mounting means securing the opposite ends of said springs to the facing sides of said L-shaped base and carrier members, said mounting means comprising dimples integral with said sides of said base and carrier extending into the adjacent ends of said coil spring, and bail means attaching said adjacent ends of said springs to said respective dimples.

2. A shock mount as set forth in claim 1, wherein said bail means comprises loops integral with the center of each said dimple, and a bar passing over the end of each said spring and through said respective loop.

References Cited in the file of this patent

UNITED STATES PATENTS

| 2,099,375 | Seward | Nov. 16, 1937 |
| 2,222,724 | Rogers | Nov. 26, 1940 |
| 2,242,832 | Mennesson | May 20, 1941 |

FOREIGN PATENTS

| 320,467 | Switzerland | May 15, 1957 |
| 723,822 | France | Jan. 19, 1932 |